Oct. 27, 1936. C. COBB, JR 2,058,952
BRAKE SHOE KEY
Filed June 10, 1933
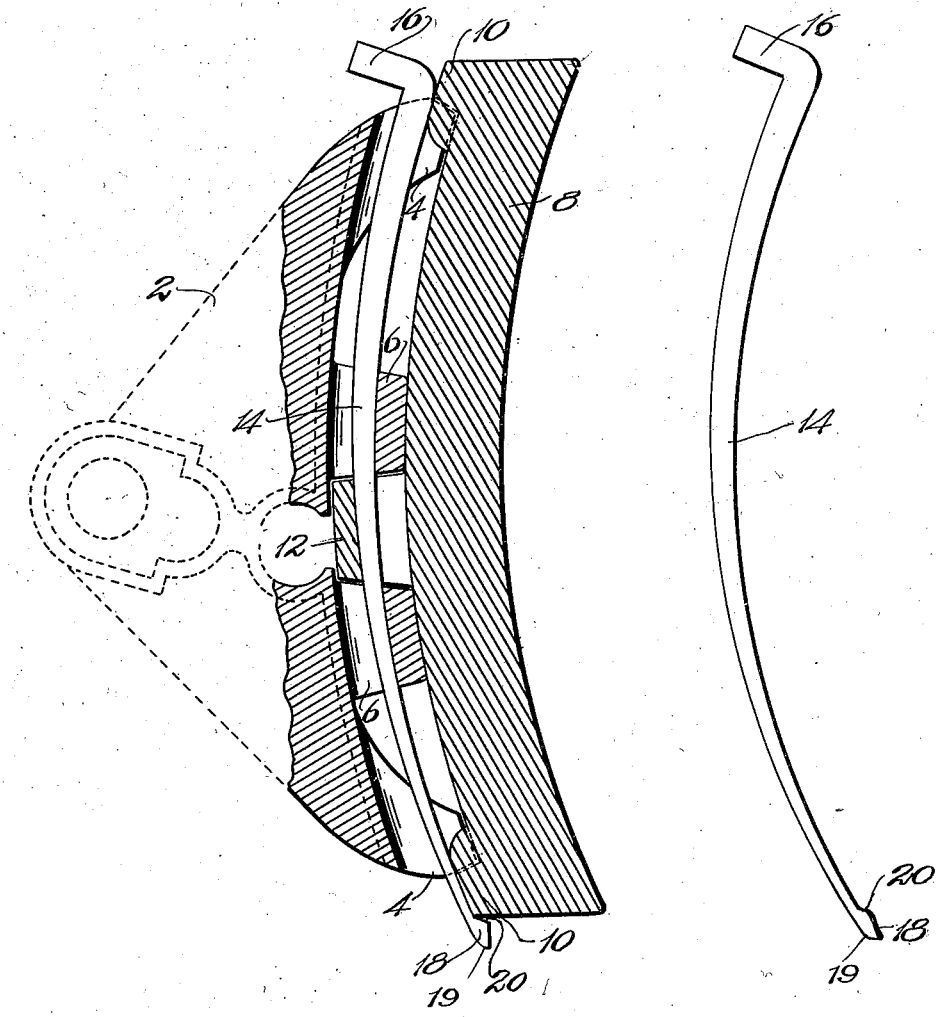
INVENTOR.
Charles Cobb Jr
BY Cyrus Kehr
his ATTORNEY Patented Oct. 27, 1936

2,058,952

UNITED STATES PATENT OFFICE 2,058,952

BRAKE SHOE KEY

Charles Cobb, Jr., Marshall, Tex.

Application June 10, 1933, Serial No. 675,307

7 Claims. (Cl. 188—243)

My invention relates to brake shoe keys which are adapted to securely hold a brake shoe to a brake shoe head.

An object of my invention is to provide a brake shoe key which will securely hold a brake shoe to a brake shoe head without allowing any motion therebetween.

A further object of my invention is to provide a brake shoe key which may be easily placed in position and securely locked against accidental displacement.

A further object of my invention is to provide a brake shoe key which may be easily removed when it is desirous to replace the brake shoe on the brake shoe head.

In the accompanying drawing,

Fig. 1 is a longitudinal view partly in section, showing the brake shoe held in position on the brake shoe head; and Fig. 2 is a side elevation of a brake shoe key.

The brake shoe head 2 is of a conventional type having toe lugs 4 and attaching lugs 6. The brake shoe 8 is likewise of standard type having the end lugs 10, and an attaching lug 12 approximately in the center of the brake shoe to be positioned between the attaching lugs 6 of the brake shoe head.

The brake shoe key 14 may be made of mild steel, wrought iron, or spring steel, and is curved, as shown, so as to conform generally to the shape of the brake shoe 8. The radius of the curvature of the key 14, is slightly shorter than the radius of the curvature of the brake shoe because the slight straightening action as the key is driven in develops more frictional contact with the lugs, 10, 11, and 14, and holds the key in place better with a tighter fit. One end of the brake shoe key 14 is bent at approximately right angles to the key forming a lug 16. At the end of the key, opposite the lug 16, I provide a locking lug 18 the end of which is beveled as at 19 on the opposite side of the key to the lug 16. The inner edge 20 of this locking lug 18 is beveled, so that it will engage the outside edge of the end lug 10 of the brake shoe. The key 14 is made of varying thickness, the thickness near the lug 16 being greater than the thickness near the lug 18, so that when the key is placed in position, it has in addition to its resiliency, as described above, a wedging effect between the lugs 6 of the brake shoe head and the lug 12 of the brake shoe. I find that it is very advantageous to provide the beveled edge 19 on the end of the lug 18 so that the key may be readily placed in its proper position.

In attaching the brake shoe to the brake shoe head, the brake shoe is placed in position so that the end lugs 10 will extend on the outside of the toe lugs 4 of the brake shoe head and the attaching lug 12 will be in position between the attaching lugs 6 of the brake shoe head. The key 14 is then inserted through the space between the lugs 6 of the brake shoe head and the lug 12 of the brake shoe and is forced through into the position, shown in Fig. 1, until the locking lug 18 has passed over the end lug 10 of the brake shoe and the bevel edge 20 of the locking lug has engaged against the outer edge of the end lug 10 of the brake shoe.

When the brake shoe key is in this position, it will securely hold the brake shoe to the brake shoe head by reason of its resiliency.

When it is desirable to remove the brake shoe from the brake shoe head, so that either part may be replaced, it is only necessary to strike the key 14 a blow or so with a hammer on the end lug 18, so as to disengage the beveled edge 20 thereof, from the end lug 10 of the brake shoe. After this first disengaging of the locking lug, the key may be readily removed by pulling on the lug 16 on the opposite end thereof.

I claim:

1. A brake shoe having attaching lugs, a brake shoe head having attaching lugs in alinement with said brake shoe attaching lugs, a key for passing through said attaching lugs, a locking lug on one end of said key, and a beveled edge on said locking lug for engagement with an end of the brake shoe, said key being curved with the beveled edge in engagement with said brake-shoe.

2. A brake shoe key made of curved spring metal, one end of the key terminating in a pointed lug, one side of which lug is a continuation of the general adjacent outer surface of the key and the opposite side of the lug having a beveled edge forming an obtuse angle with the adjacent inner portion of the key.

3. The combination with a brake shoe head, and a brake shoe, said members having interfitting attaching lugs and the lugs having openings, said openings being on a curve and in continuation of one another, of a key fashioned to enter the openings and of a different curvature from that of the alined openings in the lugs, the key being provided with a lug which has a reentrant obtuse angle on the inner side thereof of greater size than the adjacent angle of the brake shoe against which it locks to hold the several parts securely together.

4. A brake shoe key made of curved spring metal, and one end of the key terminating in a lug, one side of which lug is beveled from the outer surface of the key, and the opposite side of the lug having a beveled edge forming an obtuse angle with the inner portion of the key.

5. The combination with a brake shoe head, and a brake shoe, said members having interfitting attaching lugs with aligned openings, said openings being on a curve and in continuation of one another, of a key having a different curvature from that of the aligned openings in the attaching lugs, said key being fashioned to enter said openings to hold the brake shoe head and the brake shoe in associated relation, and a lug on one end of said key, said lug having a surface forming an obtuse angle on one side thereof to engage an edge of the brake shoe.

6. The combination with a brake shoe head and a brake shoe, said members having interfitting attaching lugs with aligned openings, said openings being on a curve and in continuation of one another, of a key having a different curvature from that of the aligned openings in the attaching lugs, said key being fashioned to enter said openings to hold the brake shoe head and the brake shoe in associated position, and a lug on one end of said key, said lug having an obtuse angle on the side thereof adjacent the inner side of curvature of said key to engage an edge of the brake shoe.

7. In a brake head and shoe assembly, the combination of a brake head, a brake shoe, said brake shoe and head having interfitting lugs for securing the same together and the brake shoe having end lugs, and a resilient key of normally less radius of curvature than when in place and inserted between the interfitting lugs for securing the shoe to the head and having the ends thereof bearing against the end lugs of the shoe and said key having a shoulder on a side thereof facing the brake shoe and coacting with a portion of said brake shoe for frictionally holding the key against withdrawal from the assembly.

CHARLES COBB, Jr.